INVENTOR.
JOACHIM RUHNAU
BY
McGlew & Toren
ATTORNEYS

United States Patent Office 3,515,376
Patented June 2, 1970

3,515,376
MACHINE FOR COATING PLATE OR SHELL-SHAPED BUILDING ELEMENTS
Joachim Ruhnau, Isernhagen, Germany, assignor to Kunststoff-Verfahrenstechnik Isernhagen HB GmbH & Co. KG, Isernhagen HB, Germany
Filed Sept. 26, 1968, Ser. No. 762,740
Claims priority, application Germany, Sept. 30, 1967, 1,652,352
Int. Cl. B28c 5/00
U.S. Cl. 259—153         8 Claims

ABSTRACT OF THE DISCLOSURE

A machine for coating plate or shell-shaped building elements with a material such as cement mortar of foamed plastics comprises a platform which is suspended on four wheels, preferably for movement over a trackway and which includes a suspended partial platform which carries the driving motor for driving the wheels. The apparatus includes a housing carried on the platform from which a swing arm is suspended. The swing arm is provided with a mixing head which is arranged to discharge the material to be applied downwardly as the vehicle is moved along the surface to be coated. The platform also carries pressure transmitter pumps for controlling the movement of the swing arm and a compressor for directing the materials such as plastic foaming materials outwardly through the mixing head.

SUMMARY OF THE INVENTION

This invention relates, in general, to coating devices and, in particular, to a new and useful vehicle carrying a pivotal mixing head which is adapted to apply a cement mortar or foamed plastic material.

The present invention is an improvement over the prior art particularly in respect to the provision of a wheeled platform which carries the necessary supply and pumping elements for applying a coating material over a large area as the platform is maneuvered over this area. Both the drive system for the platform and the equipment for operating a mixing head and the connecting lines for discharging the plastic or similar material are all carried on the platform or a subsuspension therefrom. By arranging the equipment on the same platform, the thickness of a coating such as a foam plastic may be applied in a uniform manner over a large area and, in particular, over a curved surface.

The inventive apparatus comprises a driven platform vehicle particularly a type which is adapted to be driven over a rail trackway. The devices required for applying a foam material and its various ingredients are mounted on the platform in a compact accessible manner. The platform includes the necessary driving and controlling devices and a carrying frame suspended directly below the platform which carries the driving motor for the vehicle and the pump drive for delivering the plastic materials through a mixing head. The carrying frame for the driving motor is advantageously located on a suspended portion disposed at a spaced location below the main platform. The central part of the floor panel runs parallel to the vehicle platform and its two lateral parts are oriented obliquely upwardly and outwardly to the platform, and their longitudinal edges are joined to the platform. Reinforcing bars are advantageously provided between the carrying frame and the bottom of the platform. These reinforcing bars and side frames are advantageously provided with openings to permit penetration of the wheel driving shaft for the vehicle. By locating the driving motor for the vehicle wheels and for the pumps for delivering the plastic to the mixing head under pressure on the carrying frame, the necessary elements for the coating operation may be carried in a simple and easy manner on the platform itself. This frees the top of the platform so that it can accommodate very large size units such as a compressor suited for the generation of high air pressure and an adequate compressed air storage tank which are necessary for operating the mixing head for the pressure discharge of the plastic materials. The supply tanks of the various ingredients are also accommodated on the platform around the housing for the drive unit for the swinging arm which carries the mixing head. The swinging arm is advantageously moved backwardly and forwardly in order to provide for the swinging application of the material to the surface to be covered.

Accordingly, it is an object of the invention to provide a wheeled platform carrying a housing mounting a swingable application arm having a mixing head for mixing ingredients and for discharging them downwardly as the vehicle is moved and which includes an arrangement of supply tanks for the plastic ingredients and compressed air on the platform adjacent the housing, the platform including a carrying frame mounted at a location spaced below the platform which accommodates the motor for moving the vehicle and for effecting the pumping of the materials to the mixing head.

A further object of the invention is to provide a device for applying a coating material such as a foamed plastic to a surface which is simple in design, rugged in construction, and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE PREFERRED EMBODIMENT

Figure 2:
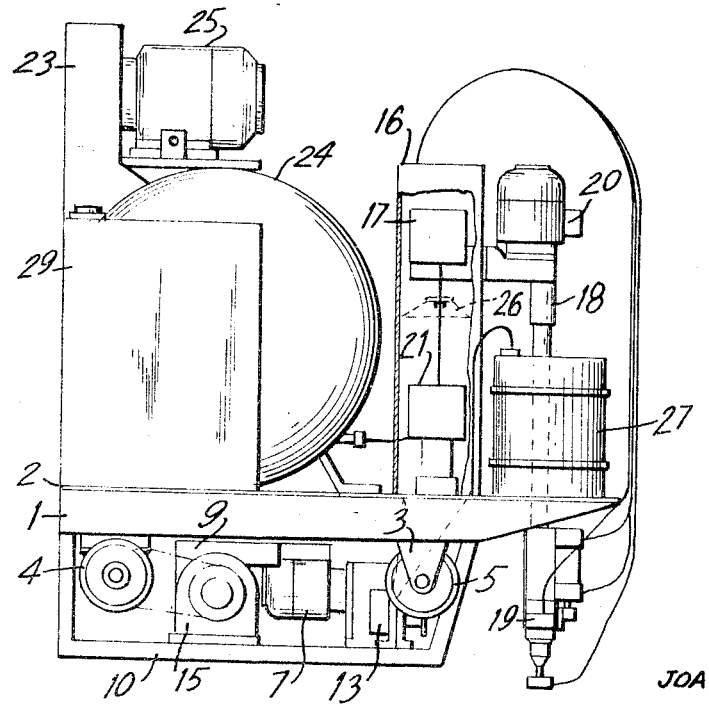
FIG. 2 is a side elevational view of the machine indicated in FIG. 1.

Referring to the drawings, in particular, the invention embodied therein comprises a vehicle serving as a carrier for a coating machine. The vehicle comprises a relatively short rectangular frame 1 which is reinforced by cross beams and which has an upper side, or top, covered by a plate 2 which, in turn, is rigidly joined to the frame structure. Holding elements or support brackets 3 are mounted at each frame corner for supporting rear and front wheel sets 4, 4 and 5, 5, respectively. The rear wheels 4 are driven through drive shaft 6 by an electric motor 7 which is disposed on a carrier plate or lower platform 10 at a location below the frame 1 (FIG. 2).

Figure 3:
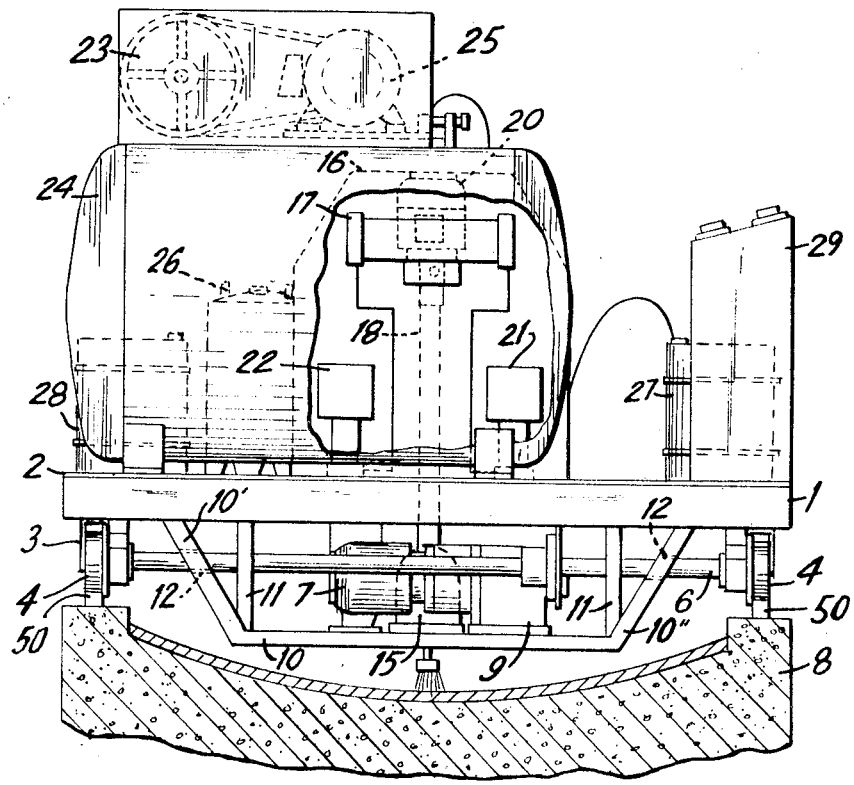
FIG. 3 is a rear elevational view of the machine indicated in FIG. 1.
Figure 4:
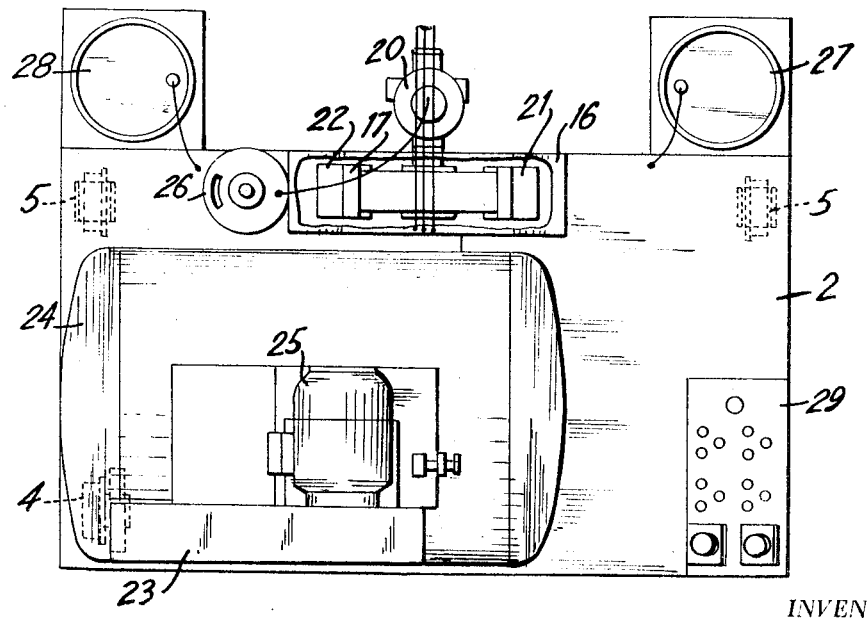
FIG. 4 is a top plan view of the machine indicated in FIG. 1.

The vehicle is designed to move on a trackway 50 above a surface such as a concrete bed 8 which is adapted to be coated with a material such as a foaming plastic. Forward and backward travel is effected by means of an electric remote control unit acting through an infinitely variable transmission 9 coupled to the drive motor 7. As shown in FIG. 3, the carrier plate 10 is suspended from the frame 1 by lateral oblique sections 10' and 10". The carrier plate 10 is joined along its longitudinal edges to the platform frame and supported at the latter by vertical bars 11. Openings 12 are provided in the bottom sectors 10' and 10" for the passage of the wheel drive shaft 6.

A dosing unit for the plastic ingredients comprising two pumps 13 and 14 and a driven motor 15 therefor is disposed on the central sector of the bottom plate 10 and is advantageously mounted on a special frame so as to be readily dismountable. A three-phase motor 15 with a hand brake serves to drive the pumps 13 and 14 driving them through sprocket chains at a definite speed.

A drive housing 16 is mounted on the plate 2 adjacent the front end of the vehicle and it accommodates a drive 17. The drive 17 affects the swinging movement of a swing arm 18 which is mounted on the housing 16 and carries a mixing head at its free swinging end. The mixing head 19 is driven by a mixing head motor 20 which, together with its associated pressure cylinder, is also mounted on the arm 18. The actuation of the driving device 17 is by pneumatic-hydraulic elements requiring very little compressed air for the transmission of its energy to pressure transmitters 21 and 22. The energy is transferred to hydraulic fluid which then drives the swinging arm at a constant rate through the device 17 which acts at a considerably higher pressure. The pressure transmission pumps 21 and 22 are also disposed in the housing 16. The driving arrangement insures a great uniformity of the back and forth motion of the swing arm 18 and the easy regulation and exact and quick reversal of the arm so that a continuous operating mode of swinging application movement is assured. Control instruments are installed in the housing 16 for the rotary drive system 17 as well as for the mixing head 19 and the pump units 21 and 22. The units required for the rotary drive mechanism are located within the housing 16, but the mixing device 19 and the swivel arm 18 are located for swinging movement outside the housing.

A compressor 23 is connected to a compressed air tank 24 and it is adequately dimensioned for the high air requirements of the entire machine. The compressor and its drive unit, such as the piston motor 25, are mounted as one structural unit on the top of a compressed air tank 24.

Figure 1:
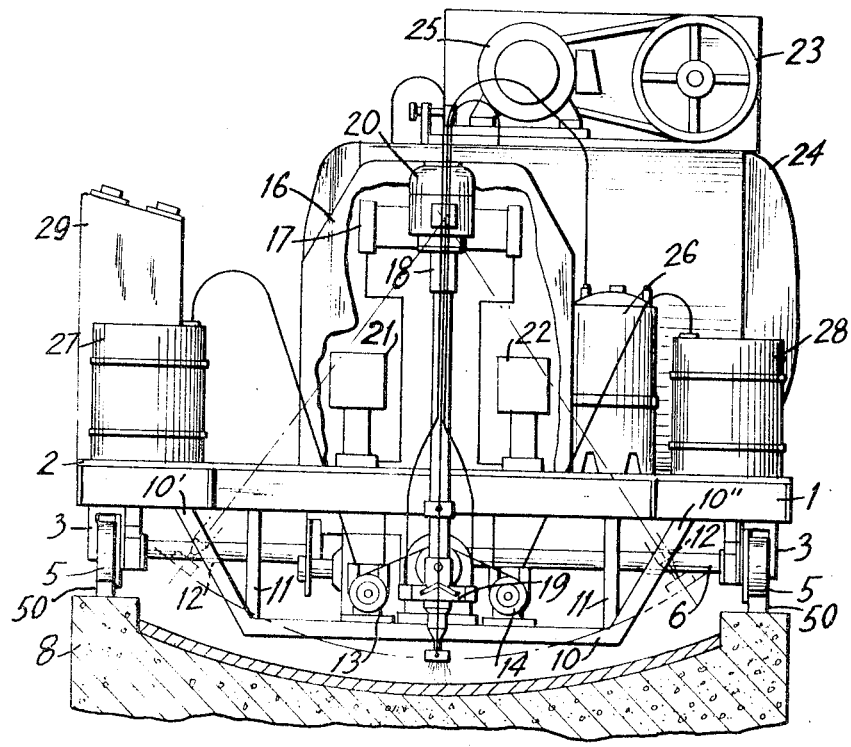
FIG. 1 is a front elevational view of a machine for applying a foamed plastic to a curved surface constructed in accordance with the invention.

A rinsing medium tank 26 containing the rinsing fluid for cleaning the spray equipment is mounted adjacent the housing 16. Tanks 27 and 28 for the plastic ingredients are located at respective opposite sides as indicated in FIG. 1. All tanks communicate with the compressed air tank 24 and by means of connecting lines extending along this swing arm 18 with the mixing head 19. Both air and liquid which are delivered to the mixing head 19 are directed out as a spray for the coating of the surface as the vehicle is moved along the trackway 50. A control switchboard 29 is also mounted on the plate 2 on the side opposite the compressed air tank 24. As indicated in top plan view, a passageway adjacent the control switchboard 29 is provided on the platform.

The machine can be operated by one person manipulating all the various elements on the platform by standing adjacent the control plane 29.

What is claimed is:
1. A machine for coating plate or shell-shaped building elements with cement mortar, foamed plastics and similar materials comprising a wheeled platform, a carrying frame suspended from and located below said platform, a driving motor for said wheeled platform mounted on said carrying frame and connected to the wheels of said wheeled platform for driving at least one of said wheels, a drive housing mounted on said platform, a swing arm mounted on said housing and having a mixing head adjacent the lower end thereof adapted to be directed downwardly and moved in a swinging movement as said platform is advanced, a supply tank for materials to be applied by said mixing head and connected to said swing arm and to said mixing head, compressed air means carried on said platform and connected to said swing arm for supplying compressed air to said mixing head.

2. A machine, according to claim 1, wherein said carrying frame comprises a flat bottom disposed at a spaced location beneath said platform and having a central part extending horizontally, and an end frame member connected to each side of said carrying frame central part extending obliquely upwardly and outwardly to said platform and being joined to said platform.

3. A machine, according to claim 2, including reinforcing rods provided between said platform and said carrying frame.

4. A machine, according to claim 3, wherein said carrying frame includes obliquely extending side portions extending upwardly to said platform, said side portion having openings therethrough, said means for driving said wheeled platform comprising a drive shaft extending through the openings of said carrying frame side portion and connected to said wheels for moving said platform.

5. A machine, according to claim 1, including a housing on said platform, a drive mechanism for swinging said swing arm carried in said housing and connected to said swing arm for moving said swing arm backwardly and forwardly, said mixing head on said swing arm including a mixing head motor, and pressure transmitters for increasing the working pressure of said drive mechanism, said housing including control instruments for said drive system and said mixing head and said pressure transmitter pumps.

6. A machine, according to claim 1, including a compressor, a compressed air tank connected to said compressor for receiving air under pressure therefrom and means connecting said compressed air tank to said mixing head, said compressor being mounted on said compressed air tank.

7. A machine, according to claim 1, including a switchboard mounted on said platform for controlling the swinging movement of said swing arm and the delivery of materials to said mixing head, and rinsing tank means carried on said platform and connected to said mixing head for rinsing said head of the ingredients prior to the use thereof.

8. A machine, according to claim 1, including drive means for driving said wheeled vehicle located on said carrying frame and pump means for dosing a material to said mixing head mounted on said carrying frame.

References Cited
UNITED STATES PATENTS

| 3,008,808 | 11/1961 | Hodges | 259—8 X |
| 3,017,164 | 1/1962 | Ayers | 259—151 |
| 3,128,995 | 4/1964 | Shaeffer | 259—151 X |
| 3,265,365 | 8/1966 | Ward | 259—8 |

R. JENKINS, Primary Examiner

U.S. Cl. X.R.
259—8